Patented Dec. 11, 1951

2,577,957

UNITED STATES PATENT OFFICE 2,577,957

PROCESS OF CALENDER FINISHING NYLON FABRIC

Edwin Farnworth and George H. Wood, Jr., Warwick, East Greenwich, R. I., assignors, by mesne assignments, to The Aspinook Corporation, Jewett City, Conn., a corporation of Delaware No Drawing. Application June 4, 1949, Serial No. 97,300

3 Claims. (Cl. 117—65)

This invention relates to the production of improved textiles having a calender finish which is permanently fast to washing and the product thereof.

Heretofore, it has been usual to treat cellulose fabric such as cotton in order to increase the resistivity of the fibers against flexion by impregnating the fabric with some resin-forming solution and then hardening the resin after applied by means of a calender and some heat treatment. The cellulose fabric in this instance is unchanged and the resin treatment is responsible in itself without assistance from the cellulose fabric for the results obtained.

An object of this invention is to provide a calender finish upon a woven fabric formed from thermo-plastic material which will increase its resistivity against flexion and when provided with embossed effects will better maintain these embossed effects than were the fabric not so resin treated.

Another object of the invention is to provide a woven product which will be rendered fast to washing by the resins which are light and practically odorless and colorless being fixed to the fabric and becoming a part thereof.

We have found that substantially the same resins when applied to a thermo-plastic woven material such, for instance, as a polyamide obtained by condensation polymerization from diamine and dibasic carboxylic acid or a material formed by vinylidene-chloride polymers and copolymers, that the resins may be made to attach to or combine with the fibers of such thermo-plastic fabrics when brought up to a certain temperature so as to permanently adhere thereto and so as to change slightly the fusing point of the original material making the fusing point somewhat higher than the original thermoplastic material of the woven fabric treated. The fabric may be treated with the resin-forming solution either all over on both sides of the fabric or it may be located in certain areas on the fabric while leaving other areas of the fabric untreated. The temperature of operation of the thermo-plastic material will approach the melting point of the material so as to soften the outer surface thereof and permit the resin which is applied to better attach itself to the material of the fabric treated.

The materials which qualify for this treatment as far as we have determined them at the present time are a polyamide obtained by condensation polymerization from diamine and dibasic carboxylic acid, hereinafter referred to as nylon, and vinylidene-chloride polymers and copolymers, commonly called Saran. The resins which qualify for this purpose are the resins of the amido formaldehyde group or carbamide aldehyde resins, or a mixture of urea and thio-urea condensation products; also a mixture of thio-urea and melamine formaldehyde or various modified urea and melamine formaldehyde resins such as methylated or butylated urea or melamine. These resins may be combined with sizing, softening, matting, or filling materials or with dyestuffs.

Less resin material is used where a thermoplastic fabric is to be treated than where a cellulosic fabric is to be treated and the distinction between the fabrics used is that there is a bonding of the resin with the material of the fabric in the case of the thermo-plastic, whereas this is not so in the cellulosic fabric. As a result of this bonding, the thermo-plastic fabric will better stand washing than where a cellulosic fabric is treated with the same resin and where embossed pattern effects are used, these embossings are found to be more permanent.

The water soluble resin is used in a quantity so that in the finished product there will be a pick-up of from 1 to 10 per cent by weight of the resin on the fabric. A solution sufficiently strong to provide this amount of resin material is then formed as a bath in a padder and an acid catalyst is used such as diammonium phosphate or ammonium sulfate or tartaric acid. The fabric to be treated is passed through padder rolls to be contacted with the aqueous resin-forming solution. The fabric is then slightly dried leaving some residual moisture something of the order of 5 to 15 per cent of the weight of the fabric, then passed through a calender which is heated in the range of from 350° to 400° F. where the fabric contacts with the rolls of the calender for a period of about ½ second, the calender being usually run at about 4 to 6 tons pressure. The fabric is then run through a curing box where a curing temperature is applied, something on the order of from 250 to 320 degrees Fahrenheit, which is a function of the time and the heat—usually the lower the heat the longer the time required, if 250°–260° is used 6 minutes is required—and then the fabric is washed in full width and further dried. This curing causes polymerization of the resin and a hardening or fixation in the final state.

In some cases in the calender there will be an embossing take place of a pattern which may be all over or over only a part of the fabric.

In operation upon a fabric of the thermoplastic character above pointed out, the curing is not critical but should be considerably less than the melting point of the plastic material. Thus, in the case of the polyamide above mentioned which melts at 468° F. the temperature should not go above 320° F. as the melting point is just a little higher than this temperature and would cause the fibers to be fused together resulting in a harsh and undesirable fabric.

Specific examples are as follows:

The following examples will serve to illustrate the method of working under our application for embossing nylon.

Example 1

30 pounds of urea are dissolved in
9¼ gallons of commercial formaldehyde solution containing approximately 37% formaldehyde.
2¾ pints of ammonia (28% solution)

are added, and the mixture is slowly heated with a closed steam coil. The heating is so adjusted that the mixture comes to a boil in twenty minutes. The steam is then shut off and the reaction mixture is diluted with an equal volume of cold water and run through a cooling coil to cool to room temperature. This partially polymerized urea formaldehyde resin solution is stable for at least a week if kept at room temperature or below. The molecular proportion of urea to formaldehyde is 1 mol urea to 2 mols formaldehyde. It contains approximately 25 per cent solids.

Ten gallons of this urea formaldehyde condensate are diluted to 30 gallons with water at room temperature. To this is added 1 pound of softener and 24 ounces of diammonium phosphate dissolved in ½ gallon of water.

The softener used in this example is sodium hydrocarbonsulphonate. Any other similar product could be used, or as a softener we could use any of the long chain alcohol sulfates or other mineral sulphonate or sulphonated castor oil. Diammonium phosphate is used as an acid catalyst and could be substituted by any other acid catalyst, such as ammonium sulfate, tartaric acid, or any catalyst sold by the resin manufacturers.

Woven nylon cloth, which after boiling off and finishing in the usual way is 41¾" wide, with a warp count of 70 and a filling count of 54, and weighing 4 yards per pound, is passed through the solution as made just above, is squeezed through a pair of rollers with sufficient set to leave approximately 60 per cent of solution on the cloth and then damp-dried on a tenter-frame to 41½" up to 42" and so as to contain 5 to 10 per cent moisture.

The cloth is then passed through an embossing calender, which is engraved in a diamond or birdseye pattern at a pressure of 4 to 6 tons and temperature 380 degrees Fahrenheit and at a speed of from 12 to 20 yards per minute to cause contact with the rolls for about ½ second. It is then run through a curing box where it is cured for 6 minutes at 285 degrees Fahrenheit. The cloth is then washed at full width through a regular open soaper. It is air-dried and framed with steam to 41½". The embossed effect is not removed by the washing and finishing process, nor is it removed by five further washings at 190 degrees Fahrenheit with soap and soda ash.

Example 2

4 ounces barium hydroxide is dissolved in
4 gallons of water at room temperature.
2 gallons of 37% formaldehyde solution are added and then
6 pounds 10 ounces of urea.

This mixture is stirred to dissolve the urea and then is heated with a closed steam coil to 30 degrees centigrade. The heat is then shut off and the temperature will continue to rise to 40 to 45 degrees centigrade. This temperature is maintained for 15 minutes by using steam or cold water in the coil if necessary.

Then carbon dioxide is bubbled in slowly until the solution is neutral to pH paper. One and one half quarts of 37% formaldehyde solution are then added, and the total volume is brought to 8 gallons with cold water. After this mixture has laid for several hours, the barium carbonate formed will settle to the bottom. The clear liquor is then decanted and consists of approximately 20% dimethylolurea solution. The molecular proportion of urea to formaldehyde is 1 mol of urea to 2.4 mols of formaldehyde.

The 8 gallons of partially polymerized resin, as made up above, is diluted to 16 gallons with cold water. One pound of softener is added as in Example No. 1 and also 12 ounces of catalyst is added as in Example No. 1.

A nylon and viscose cloth which has a grey width of 40 inches and warp count of 120 and filling count of 82 and weighing 4.36 yards per pound, which has been previously scoured and dyed, is padded through this resin solution and squeezed so that the cloth picks up approximately 70 per cent of its dry weight of impregnating liquor. It is then dried on a tenterframe to 38½" so that when it comes off the frame it contains approximately 10 percent moisture. The cloth is then embossed through a calender as in Example No. 1, which has a roller engraved in a pattern to produce a chevron effect. It is then dried, cured continuously at 300 degrees Fahrenheit for 3 minutes. It is then washed with soap and soda ash at 140 degrees Fahrenheit to 160 degrees Fahrenheit, extracted, air-dried, and framed with steam to 38".

The chevron effect is not removed by the washing and finishing process, nor is it removed by 5 washings of 10 minutes each at 190 degrees Fahrenheit with soap and soda ash. A sample of the same cloth put through the same processing steps, but omitting the application of resin, would give an embossed effect that was not fast to washing.

Example 3

12½ pounds Resloom HP Special (a melamine formaldehyde resin partially polymerized, as furnished by Monsanto Chemical Company) are dissolved in
30 gallons of water.
1 pound of softener is added, and
1 pound of diammonium phosphate (catalyst)

A nylon taffeta cloth, 46" wide with a count of 115 in warp and 77 in filling, weighing approximately 4.20 yards per pound, was padded through the above resin solution so that the cloth increased in weight approximately 60 per cent. It was then damp-dried on a tenterframe to 46" so that it still contained approximately 8 per cent moisture. A part of this cloth was then embossed in the birdseye effect of Example No. 1 and a part in the chevron effect of Example No. 2 through a calender having the conditions of Example No. 1.

In each case, the cloth was immediately dried following embossing, and cured for 4 minutes at 290 degrees Fahrenheit. It was then washed and finished as described in Example No. 1, except that the finished width was 46". In both cases the embossed effect was retained and was fast to subsequent washings.

The amount of resin necessary to give a washfast embossed effect varies from 2½ to 5 per cent in the case of melamine formaldehyde resins to 4 to 8 per cent with the urea formaldehyde resins. Example No. 1, for instance, using an 8 per cent resin solution with 60 per cent pick-up would give approximately 5 per cent resin on the cloth. Example No. 2, using a 10 per cent solution and 70 per cent pick-up, would give approximately 7 per cent resin on the cloth. These two examples are with urea formaldehyde resins. Example No. 3, using melamine formaldehyde resin-condensate in a 5 per cent solution and with a 60 per cent pick-up, would give 3 per cent of the melamine formaldehyde resin on the cloth. In all examples the calender was heated to 380 degrees Fahrenheit. This temperature is not too critical and could vary from 350 degrees Fahrenheit to 400 degrees Fahrenheit.

We find that in the use of urea formaldehyde on the polyamide material there will be 3 to 10 per cent present on the fabric by weight, whereas a lesser amount of the melamine formaldehyde may be used on the polyamide, namely from 1 to 5 per cent.

We claim:

1. The process of producing calender finishes on woven nylon textile fabrics comprising applying to the fabric an aqueous precondensate of a resin selected from a group consisting of melamine formaldehyde and urea formaldehyde, in an amount capable of ultimately depositing from 1 to 10% of a solid resin with reference to the weight of the fabric, drying the fabric slightly and while moist passing through an embossing calender at a temperature of 350° to 400° F. and a calender pressure of from 4 to 6 tons and at a speed to cause contact of the fabric with the calender for substantially ½ second to soften the outer surface portion of the fabric being treated and cause combining of the resin therewith, and then curing the resin by heating for a period of time sufficient to harden the same to a final state without deterioration of the fabric whereby the embossed calender finish becomes permanently fast to washing.

2. The process of claim 1 wherein the resin is urea formaldehyde and the amount deposited is from 3 to 10%.

3. The process of claim 1 wherein the resin is melamine formaldehyde and the amount deposited is from 1 to 5%.

EDWIN FARNWORTH.
GEORGE H. WOOD, Jr.

REFERENCES CITED

The following references are of record in the file of this patent:

UNITED STATES PATENTS

| Number | Name | Date |
| --- | --- | --- |
| 2,049,217 | Meunier | July 28, 1936 |
| 2,121,005 | Bener | June 21, 1938 |
| 2,370,362 | Light | Feb. 27, 1945 |
| 2,481,809 | Barnes | Sept. 13, 1949 |

OTHER REFERENCES

The Condensed Chem. Dict., 3rd ed. page 160, Rheinhold Publ. Co.